United States Patent [19]
Greverath

[11] Patent Number: 5,806,558
[45] Date of Patent: Sep. 15, 1998

[54] FLOW CONTROL VALVE WITH IMPELLER HAVING SPHERICAL EDGE

[75] Inventor: Peter H. Greverath, Ferndale, Mich.

[73] Assignee: W. A. Kates Company, Clawson, Mich.

[21] Appl. No.: 606,399

[22] Filed: Feb. 23, 1996

[51] Int. Cl.[6] .................................................. G05D 7/01
[52] U.S. Cl. ............................................................. 137/501
[58] Field of Search ................................... 137/501, 502, 137/503, 504

[56] References Cited

U.S. PATENT DOCUMENTS

| | | | |
|---|---|---|---|
| 3,023,591 | 3/1962 | Tilney | 137/501 X |
| 3,223,115 | 12/1965 | Kates | 137/501 |
| 3,438,389 | 4/1969 | Lupin | 137/504 |
| 3,762,433 | 10/1973 | Moore | 137/504 X |
| 5,249,599 | 10/1993 | Haynes et al. | 137/501 |

*Primary Examiner*—Stephen M. Hepperle
*Attorney, Agent, or Firm*—Charles W. Chandler

[57] ABSTRACT

A fluid-flow controller having an internal impeller. The impeller is reciprocally mounted within an orifice sleeve and has a peripheral surface engaging the sleeve forming a segment of an imaginary spherical surface.

2 Claims, 2 Drawing Sheets

5,806,558

FLOW CONTROL VALVE WITH IMPELLER HAVING SPHERICAL EDGE

BACKGROUND OF THE INVENTION

This invention is related to an automatic flow rate controller which employs a pressure differential impeller to automatically maintain a constant flow rate to a controlled device, and more particularly to an impeller having an edge surface forming a part of an imaginary sphere.

Flow rate regulators of this type employ an adjustable orifice formed by an elongated circumferential 160° slot in a cylindrical orifice sleeve which is rotated about a second slot in an inner orifice cylinder. When the two slots coincide, the orifice has its maximum open area. When the sleeve is rotated, the wall of the sleeve blocks the slot in the cylinder in proportion to the angle of rotation of the sleeve. One problem with this type of controller is the leakage that occurs between the sleeve and the orifice cylinder and a galling condition caused by the two cylinders rubbing in metal-to-metal contact.

A conventional automatic differential pressure controller also includes an impeller, a spring, a valve sleeve and a valve tube. The impeller reciprocates in the upper part of the orifice sleeve, driven by a force balance between a fluid pressure differential across the impeller, and a spring force. The impeller moves axially with the valve sleeve to open or close valve ports in the valve tube.

Prior knowledge demanded that the clearance between the impeller and the orifice sleeve be increased to eliminate galling conditions which then created looseness. The looseness creates an unpredictable fluid passage between the impeller edge and the orifice sleeve. To correct this problem, a relatively thick impeller has been provided which slides up and down inside the orifice sleeve. However, the impeller then has a tendency to become cocked or hung up in the orifice sleeve during assembly and during operation when the impeller is not perfectly perpendicular to the orifice sleeve.

Typically the impeller has a disk shaped configuration with a cylindrical edge.

SUMMARY OF THE INVENTION

One object of the present invention is to provide an improved fluid flow rate controller of the type having an orifice sleeve rotatably slideably mounted around an orifice cylinder. In the preferred embodiment of the invention a pair of Teflon bands are mounted between the orifice sleeve and the orifice cylinder on opposite sides of the orifice openings to provide a seal as well as a sliding relationship between the two cylindrical components. The bands prevent galling, and reduce the torque necessary to turn the sleeve on the cylinder.

Still another object is to employ a disk-like impeller having an edge surface forming a part of an imaginary sphere having a radius slightly smaller than the radius of the internal wall of the orifice sleeve. This curvature provides two advantages. One, the impeller diameter can be increased thereby reducing the fluid flow that typically passes between the impeller and the wall of the orifice sleeve. Secondly, the impeller can be inserted into the sleeve without becoming cocked. It is analogous to inserting a ball into the sleeve. The impeller has no edges that can wedge in the sleeve.

Still further objects and advantages of the invention will become readily apparent to those skilled in the art to which the invention pertains upon reference to the following detailed description of the preferred embodiment.

THE DESCRIPTION OF THE DRAWINGS

The description refers to the accompanying drawings in which like reference characters refer to like parts throughout the several views and in which.

DESCRIPTION OF THE PREFERRED EMBODIMENT OF THE INVENTION

Figure 1:
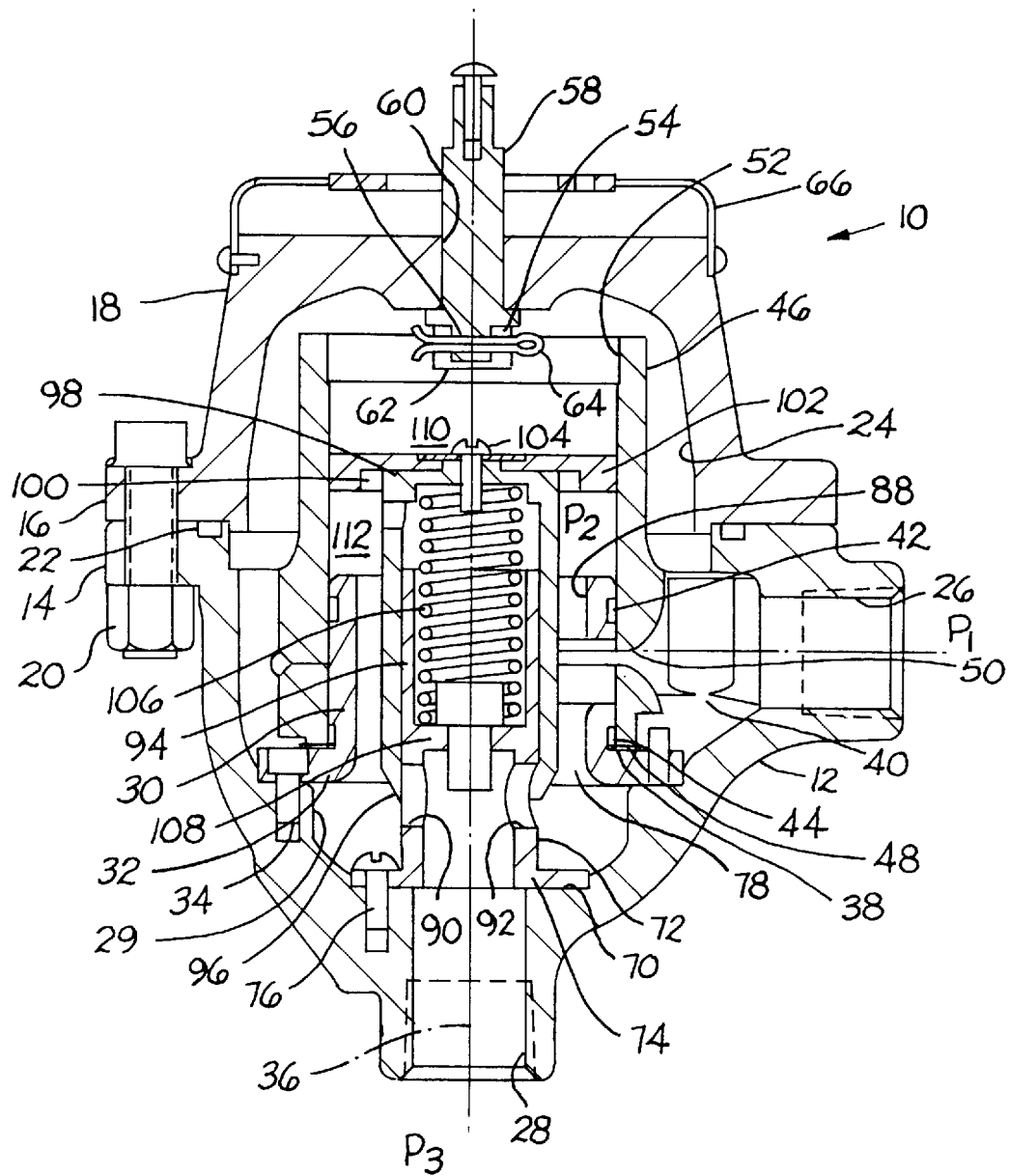
FIG. 1 is a sectional view of a flow-rate controller illustrating the invention.

Referring to the drawings, FIG. 1 illustrates a preferred flow-rate controller 10 which comprises a housing formed of a lower housing section 12 having an annular flange 14 in face-to-face contact with an annular flange 16 of an upper housing section 18. A plurality of threaded fastener means 20 (only one shown) join the two flanges together. An "O" ring 22 is mounted between the opposed faces of the flanges to provide a fluid-tight seal between the two housing halves.

The housing defines an internal fluid chamber 24 connected to a side inlet opening 26 and a bottom outlet opening 28.

Lower housing section 12 has an internal annular seat 29. Orifice cylinder 30 has an annular lip 32 seated on seat 29. Lip 32 is fastened to the housing by a pair of screw means 34. The orifice cylinder has a longitudinal axis that coincides with the axis 36 of outlet opening 28.

The orifice cylinder supports an annular Teflon band 38 on the upper surface of lip 32.

The orifice cylinder has an orifice slot 40 which extends about 160° about axis 36. Slot 40 provides a passage for a fluid, such as water, being received through inlet opening 26 into the interior of the orifice cylinder and toward the bottom of chamber 24. A pair of low friction teflon bands 42 and 44 are disposed in annular slots in the cylinder above and below slot 40. Bands 42 and 44 are sealing elements having an axial length that is greater than their thickness and which extend radially beyond the side surface of the orifice cylinder. The bands could also be formed of a material that is either harder or softer than the material of the sleeve or the cylinder, that is, a dissimilar material to prevent galling.

A cylindrical orifice sleeve 46 is disposed in chamber 24 and has a lower edge at 48 slideably rotatably seated on Teflon band 38. The internal cylindrical surface of the orifice sleeve is rotatably mounted around the orifice cylinder and is slideably engaged with Teflon bands 42 and 44. The orifice sleeve has a thin orifice slot 50 which is much narrower than slot 40 and also extends about 160° around axis 36.

The orifice sleeve has an upper open end 52. A bar 54 is attached to and spans open end 52. Bar 54 has a vertical opening 56. An adjuster shaft 58 is rotatable mounted in an opening 60 in the upper end of the upper housing section and has its lower end 62 received in opening 56. Cotter pin 64 extends through both the bar and the lower end of the adjuster shaft to connect the two together so that the adjuster shaft provides a means for rotating the orifice sleeve to an adjusted position on the orifice cylinder to adjust the opening through which fluid can pass through the orifice slots.

Scale 66 is mounted on the upper end of the upper housing around the adjuster shaft. The user rotates adjuster shaft 58 and the orifice sleeve in one direction to fully open orifice cylinder slot 40 by aligning orifice sleeve slot 50 with orifice cylinder slot 40. By rotating the orifice sleeve in the opposite direction a selected distance, the sleeve wall will partially block orifice cylinder slot 40 to control the rate of fluid passing through inlet opening 26. The orifice sleeve can be rotated to a fully closed position in which the wall of orifice sleeve 46 fully blocks slot 40.

The lower housing section has a second annular seat 70 formed around axis 36 and outlet opening 28. A cylindrical valve tube 72 has a lower annular flange 74 seated on seat 70. Three threaded fastener means 76 (only one shown) fasten the valve tube to seat 70. The valve tube has a diameter substantially smaller than the diameter of the orifice cylinder to form an annular passage 78 below orifice slot 40, and an upper annular passage 88 above orifice slot 40. The valve tube has three valve tube ports 90 and 92 and a third port (not shown) for passing fluid from the lower part of chamber 24 into the interior of the valve tube.

A cylindrical valve sleeve 94 is axially slideably mounted on the valve tube. The lower end of the valve sleeve has a somewhat tapered configuration at 96 and slides axially to adjust the effective fluid-passing opening of the valve tube ports. The valve sleeve has a closed head 98, and a port 100 which admits fluid inside the valve sleeve to the underside of head 98. This allows the effective area of $P_2$ to be approximately equal to the effective area of the incoming fluid pressure $P_1$.

An impeller disk 102 is mounted on the valve sleeve head and loosely attached to the valve sleeve by fastener 104. The fastener permits the impeller to self-center itself in the orifice sleeve, and on the valve sleeve.

A coil spring 106 is mounted between an annular shoulder 108 in the valve tube above the three valve tube ports, and beneath the valve sleeve head. The spring biases the impeller upwardly toward a high-pressure portion 110 of the internal chamber normally filled with fluid pressure at $P_1$ and away from a low pressure portion 112, below the bottom face of the impeller normally containing a lesser pressure $P_2$.

Figure 2:
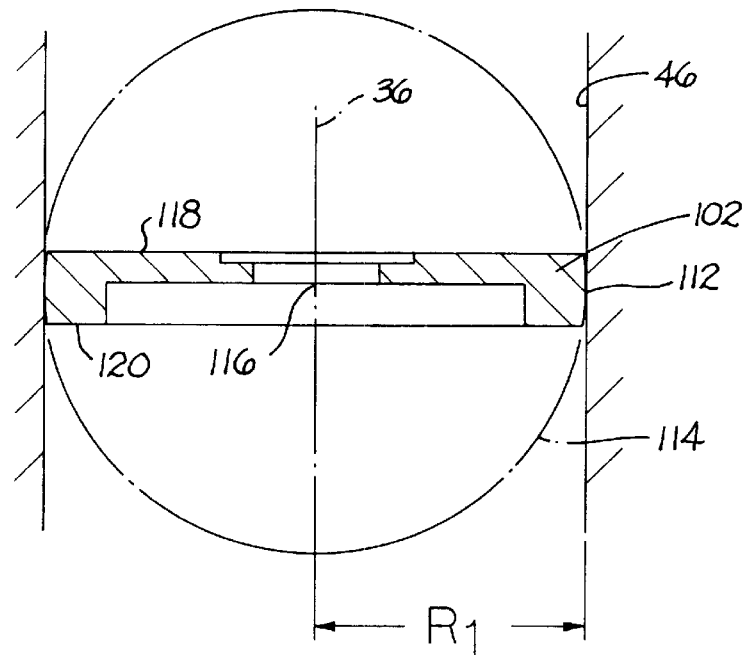
FIG. 2 is an enlarged sectional view of the impeller separated from the orifice sleeve.
Figure 3:
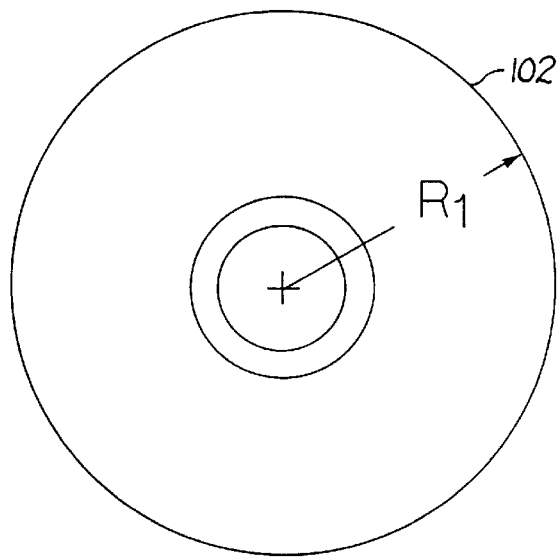
FIG. 3 is a plan view of the impeller of FIG. 2.

Referring to FIGS. 2 and 3, the impeller is shown separated from the valve cylinder but slideably mounted inside orifice sleeve 46. The impeller moves axially along axis 36 inside the orifice sleeve and has a peripheral annular surface 112 slideably engaging the surface of the orifice sleeve. Surface 112 forms an annular segment of the surface of an imaginary sphere 114 having a radius ($R_1$) that is slightly less than the radius of the internal wall of the orifice sleeve. Center 116 of the sphere is preferably disposed halfway between the planar upper high pressure face 118 of the impeller and the lower planar low pressure face 120 of the impeller. Face 118 is parallel to face 120. The impeller cannot hang up in the orifice sleeve during assembly because it forms a part of a sphere.

Figure 4:
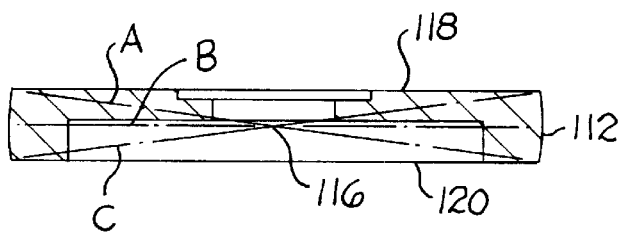
FIG. 4 is another view of the impeller, similar to FIG. 2.

FIG. 4 shows another view of the impeller. Although surface 112 of the segment may be formed with any of a variety of radii, the maximum radius of the surface is no greater than $R_1$ which is the internal radius of the valve cylinder. It may have a lesser radius as long as it is convexly curved. However the preferred impeller has an annular peripheral surface forming a part of sphere 114 because it cannot hang up in opening of sleeve 46, and because this curvature will leak the least amount of fluid from the high pressure side to the lower pressure side around the edges of the impeller. A smaller radius may be acceptable in those cases where the amount of leakage between the impeller and the valve sleeve is not critical.

Referring to FIG. 4, the preferred impeller will be constructed such that a line "A" which connects the inner section between the sphere and the upper surface on the left side, as viewed in FIG. 4, and the sphere in the lower surface has the same length as a line "B" which passes through center 116 parallel to the upper and lower surfaces and which in turn has the same length as a line "C" which connects the lower left hand corner that is, the inner section between the lower face and the sphere, and the upper face on the right hand side as viewed in FIG. 4.

The operation of the flow-rate controller is relatively conventional. Inlet fluid at pressure $P_1$ enters through inlet opening 26, passes through slots 40 and 50, passes downwardly to the lower part of internal chamber 24, through that portion of ports 90 and 92 not blocked by the lower edge of the valve sleeve, and through outlet opening 28. The pressure of the fluid received through slot 40 is reduced to a level $P_2$ so that the impeller is exposed to a pressure differential between pressure $P_2$ below the impeller and pressure $P_1$ above the impeller. The predetermined pressure differential or drop is equal to the force of spring 94 divided by the area of the square inch area of the impeller. The fluid pressure is further reduced as it passes through ports 90 and 92 to $P_3$. In response to an increase in inlet pressure $P_1$ the same pressure $P_1$ in high pressure chamber 110 increases causing the impeller to act against the compression spring and slightly close ports 90 and 92 to reduce the effective orifice opening but maintaining the same fluid flow rate. The pressure-sensing impeller maintains the output flow rate constant.

Having described my invention, I claim:

1. In a fluid flow controller having a housing with an internal chamber, an inlet opening for receiving a fluid under pressure into the internal chamber, and an outlet opening for discharging said fluid from the internal chamber, valve means disposed in the internal chamber for passing fluid from the inlet opening to the outlet opening, the valve means including a sleeve with a cylindrical internal opening formed about an axis, an impeller mounted in the sleeve, the impeller having a pair of spaced faces and being reciprocally movable in the sleeve such that at least one of the faces is generally perpendicular to said axis, the impeller having an annular peripheral surface joining said at least one of the faces and being slideably engageable with the internal wall of the sleeve, the annular surface having a convexly curved smooth profile extending axially from said at least one of the faces and extending entirely around the annular peripheral surface of the impeller; and in which the valve means includes a piston that is moveable along the axis of the sleeve, and the impeller is connected to the head of the piston.

2. In a fluid flow controller having a housing with an internal chamber, an inlet opening for receiving a fluid under pressure into the internal chamber, and an outlet opening for discharging said fluid from the internal chamber, valve means disposed in the internal chamber for passing fluid from the inlet opening to the outlet opening, the valve means including a sleeve with a cylindrical internal opening formed about an axis, an impeller mounted in the sleeve, the impeller having a pair of spaced faces and being reciprocally movable in the sleeve such that at least one of the faces is generally perpendicular to said axis, the impeller having an annular peripheral surface joining said at least one of the faces and being slideably engageable with the internal wall of the sleeve, the annular surface having a convexly curved smooth profile extending axially from said at least one of the faces and extending entirely around the annular peripheral surface of the impeller; and in which the internal valve means includes an orifice sleeve having an arcuate slot, and an inner orifice cylinder around which the orifice sleeve can be rotated, the inner cylinder having a slot disposed so as to vary the effective fluid passage through the orifice sleeve.

* * * * *